United States Patent
Ochs

[19]

[11] Patent Number: 6,009,719
[45] Date of Patent: Jan. 4, 2000

[54] SYSTEM FOR THERMAL TREATING OF FOOD PRODUCTS

[75] Inventor: Gregory L. Ochs, Kirkland, Wash.

[73] Assignee: York International Corporation, York, Pa.

[21] Appl. No.: 09/073,562

[22] Filed: May 6, 1998

[51] Int. Cl.[7] .................................................. F25D 25/04
[52] U.S. Cl. .............................................. 62/380; 62/63
[58] Field of Search ............................................ 62/63, 380

[56] References Cited

U.S. PATENT DOCUMENTS

| | | |
|---|---|---|
| 3,507,128 | 4/1970 | Murphy et al. . |
| 3,553,973 | 1/1971 | Moran . |
| 3,605,434 | 9/1971 | Boese ................................... 62/380 X |
| 4,109,569 | 8/1978 | Kemper ...................................... 99/483 |
| 4,205,536 | 6/1980 | Kasahara ................................... 62/380 |
| 4,576,014 | 3/1986 | Miller et al. ............................. 62/268 |
| 4,576,215 | 3/1986 | Kauserud .................................. 164/15 |
| 4,646,809 | 3/1987 | Kauserud .................................. 164/15 |
| 4,881,379 | 11/1989 | Sakai ........................................ 62/380 |
| 4,912,943 | 4/1990 | Hubert et al. ......................... 62/380 X |
| 4,972,681 | 11/1990 | Löfkvist ................................... 62/374 |
| 4,989,416 | 2/1991 | Miller et al. ............................. 62/381 |
| 5,156,008 | 10/1992 | Olsson et al. ............................. 62/63 |
| 5,520,012 | 5/1996 | Strong et al. ............................. 62/380 |
| 5,551,251 | 9/1996 | Ochs et al. ................................ 62/380 |
| 5,878,582 | 3/1999 | Appolonia et al. ................... 62/380 X |

FOREIGN PATENT DOCUMENTS

| | | |
|---|---|---|
| 665449 | 2/1994 | Australia . |
| 580466A | 6/1993 | European Pat. Off. . |
| 9730603A | 2/1997 | WIPO . |

*Primary Examiner*—William Doerrler
*Attorney, Agent, or Firm*—Dowrey & Associates

[57] ABSTRACT

A quick-freeze thermal treating system for food products which comprises at one first zone of thermal treatment. The first zone provides a film contact conveyor comprised of a thermal surface, a traveling thin film, a drive for moving the thin film across the thermal surface, and a control for controlling and monitoring the drive. The first zone also provides a convection refrigeration assembly for refrigerating air for distribution on to the traveling thin film, and an air circulating assembly for directing refrigerated air from the refrigeration assembly onto the thin film from above so that food products are crust frozen simultaneously from above and below. A second zone underlaying the first zone may be provided in the form of a second conveyor comprised of a product conveyor, a second drive for the second-conveyor and a second control for controlling and monitoring the second drive, the second conveyor being located such that food products may be cascaded from the traveling thin film downward onto the product conveyor. The second and subsequent conveyors may be film contact conveyors, like the first zone film contact conveyor, or they may be open-mesh endless loop conveyors. The first zone film contact conveyor is maintained at a lowered temperature. The subsequent thermal treatment zones are refrigeration zones that may be film contact refrigerated conveyors, or updraft, cross-draft or impingement jet refrigerated air open-mesh endless loop conveyors.

27 Claims, 6 Drawing Sheets

SYSTEM FOR THERMAL TREATING OF FOOD PRODUCTS

BACKGROUND OF THE INVENTION

1. Field of the Invention

This invention relates to systems for cooling or heating food products by conveying the food products through a cooling or heating zone.

2. Brief Description of the Prior Art

Food products such as hamburger patties or fish fillets are processed by quick freezing techniques primarily on long continuous conveyor systems. Refrigerated air is typically blown across the product to remove heat. Due to the relatively slow rate of heat transfer these systems require large amounts of conveying surface area to hold substantial quantities of food products for the required duration. These carrying systems can be linear or helical and typically require a substantial amount of space.

SUMMARY OF THE INVENTION

A primary object of the present invention is to provide a system for quick freezing of food products where the products are conveyed through a first freezing zone along a first conveyor course where the food products are simultaneously surface frozen on the bottom and top sides. Another object is to provide such a first freezing zone where the bottom-side surface-freezing in the first freezing zone occurs along the first conveyor course where the food products are conveyed on a thin film sheet across a refrigerated surface so that the food product bottom sides in contact with the thin film will be surface-frozen by conduction as they pass across the refrigerated surface. Still another object is to provide such a first freezing zone where the top-side surface-freezing occurs by simultaneously exposing the top sides to refrigerated air streams directed downward onto the food products from overhead. A further object is to provide one or more subsequent conveyor courses arranged below the first conveyor course in a stacked arrangement below the first course so that food products can cascade from the end of one course onto the beginning of a subsequent course or courses. A still further object is to provide a second or third course where the food products are conveyed through a refrigerated zone for further cooling, being cascaded from one course to another.

These objects and advantages will become apparent from the following description of the invention.

In accordance with these objects and advantages, the invention comprises a quick freezing system for food products which comprises at least one quick-freezing zone where the food products are quick-frozen on their bottom sides by conduction and are simultaneously quick-frozen on their top sides by convection.

A first zone provides a film contact conveyor comprised of a thermal surface, a traveling thin film, a drive for moving the thin film across the thermal surface, and a control for controlling and monitoring the drive. The first zone also provides a convection refrigeration assembly for refrigerating air for distribution on to the traveling thin film, and an air circulating assembly for directing refrigerated air from the refrigeration assembly onto the thin film from above so that food products are crust frozen simultaneously from above and below. A second zone may be provided to underlay the first zone and provide a second conveyor comprised of a product conveyor, a second drive for the second conveyor and a second control for controlling and monitoring the second drive, the second conveyor being located such that food products may be cascaded from the traveling thin film downward onto the product conveyor. The second and subsequent conveyors may be film contact conveyors, like the first zone film contact conveyor, or they may be open-mesh endless loop conveyors. The first zone film contact conveyor is a refrigeration zone maintained at a lowered temperature. The subsequent thermal treatment zones are refrigeration zones that may be film contact refrigerated conveyors, or updraft, cross-draft or impingement jet refrigerated air open-mesh endless loop conveyors.

DESCRIPTION OF THE PREFERRED EMBODIMENT

Figure 1:
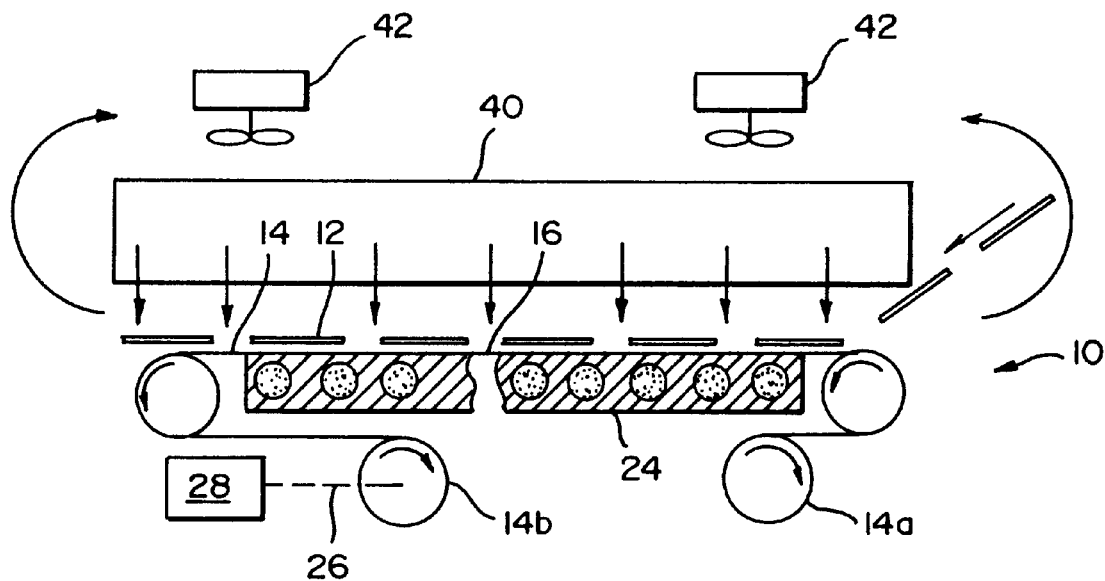
FIG. 1 depicts the first zone of a quick-freezing system comprised of a lower traveling thin film conveyor conduction refrigeration subsystem in combination with an overhead forced-air convection refrigeration subsystem, where the overhead refrigeration subsystem directs low-velocity cold air onto the top sides of the food products.

The system of this invention provides a first zone 10 for thermal treatment of food products 12 by transporting the food products on a traveling thin film conveyor 14 where the thin film conveyor moves continuously across a thermal surface 16 to thermally condition the contacting surface of the food products by conduction through the thermal surface 16 and the thin film of the conveyor 14.

The system may also provide a subsequent refrigeration zone 18 for thermal treatment of the food products 12 where the products are deposited from the end of the thin film conveyor onto a subsequent conveyor 114 for further thermal treatment. The thermal conditioning occurring in zone 18 may be by thermal conduction or convection, depending on the form of heat transfer mechanism employed in that zone. A subsequent refrigeration zone 22 for thermal treatment of the food products 12 may also be provided where the products are deposited from the end of conveyor 114 onto a subsequent conveyor 214 for further thermal treatment. The thermal conditioning occurring in zone 22 may be by thermal conduction or convection, depending on the form of heat transfer mechanism employed in that zone. The zones 10 and 18, and 22 if provided, are preferably stacked one below another and arranged so that food products may calscade downward from the end of one conveyor onto the beginning of the subsequent conveyor. Although not shown in the Figures, it would be appropriate for some food products to provide a transfer mechanism for transferring food products from one conveyor to the other, such as a slide or guide or other means, and the transfer could upend the food products as well so that the unprocessed side could be placed side-down on the subsequent conveyor.

In zone 10, a contact table 24 has a flat upper segment that provides the refrigerated surface 16. The thin film conveyor 14 comprises the thin film 14 provided as an elongated sheet or web that is transported from an infeed supply roll 14a to a take-up roll 14b so that the thin film 14 may be pulled from the infeed roll 14a and wound up on the take-up roll 14b. Food products 12 are deposited onto the thin film 14 at a location immediately adjacent the beginning of the contact table 24 by any suitable means and the film in turn slides across the refrigerated surface so that, through conduction, heat is transferred from the food products 12 to the refrigerated surface 16. An appropriate drive mechanism 26 would be coupled to one or both rolls 14a, 14b so as to effect and control the movement of the thin film 14 across the contact table 24. Typically, the drive mechanism would include film guides and a controllable gearmotor driving the take-up roll onto which used film is rolled, and a controller 28 to control the film speed in addition to controlling the starting and stopping of film travel. Typically a variable frequency drive (VFD) will be the means to vary the speed of the gearmotor and consequently the film speed. Since accurate film speed may be critical, systems will typically have a speed monitoring device such as an encoder to feed back speed information to the VFD. This in turn allows automatic adjustments of the gearmotor thus maintaining precise film speed control.

The refrigerated surface 16 crust-freezes the bottom surfaces of the food. This surface may be refrigerated by any of several means, including circuited refrigerant such as ammonia circulated through the contact table 24, cryogens which are sprayed on the underside of the thermal surface 16 within the contact table 24, or cold air blast against the underside of the thermal surface 16 within the contact table 24.

The first zone 10 provides a film contact conveyor system composed of (a) a refrigerated surface, (b) a traveling thin film, (c) a drive mechanism for moving the thin film across the thermal surface, and (d) a control system for controlling and monitoring the drive mechanism. The thin film contact freezer can crust freeze the bottom surface of food products rapidly through a highly efficient solid to solid heat transfer effect. During this phase, food products are carried on the thin continuous film conveyor over the thermal surface cooled to a low temperature on the order of −40° C. to −52° C. Upon contact, the food product's bottom surface begins to freeze instantly. Because of the rapid crust freezing on the flat surface, product deformation and belt markings are avoided when the product is transferred to a traditional open wire mesh belt. Typically, it only takes about one minute to freeze the product's bottom surface to a depth of one millimeter, a depth sufficient to enable further thermal processing without product deformation of marking. By using a continuous thin film conveyor, impeccable hygiene standards can be achieved due to the single pass usage of the thin film. This form of crust freezing reduces the dehydration effect and drip loss typically experienced in conventional mechanical freezing systems by up to 50%, thereby increasing product yields, and drip loss of the product when thawed is also dramatically reduced. After usage, the thin film take-up roll can be replaced in a few minutes by either using an adhesive tape or simply tying a knot between the old and new film segments. In addition, the freezing area of zone 10 is self-defrosting since frost build-up is continuously removed by the film conveyor and the system can be run for days without stopping to be defrosted. The length of the conveyor in this first zone 10 can be as short as two to six meters long. The system within the first zone 10 can be provided, also, in ten foot modules (3000 mm) and width from 1.5 to 7.2 feet (450 to 2160 mm), with crust freezing capacities varying from 100 to 10,000 pounds per hour (45 to 4500 kilograms per hour). This first zone of contact freezing is particularly well suited for difficult food products that are soft, sticky and wet, or need hand shaping before freezing. Suitable film material for the thin film 14 includes ½ mil. polyethylene.

In addition to the lower thin film conveyor and conduction freezer arrangement in the first zone 10, zone 10 also provides a refrigerated air convection quick-freezing subsystem for quick-freezing the top sides of the food products.

According to FIG. 1, the convection subsystem comprises a refrigeration assembly 40 located appropriately so that air fans 42 could draft low velocity air through the refrigeration coils of the refrigeration assembly for cooling to the desired freezing temperature, and then down onto the thin film conveyor 14. The air fans 42 could also recirculate air from the conveyor course back through the refrigeration coils continuously, as indicated by the curved arrows.

Figure 2:
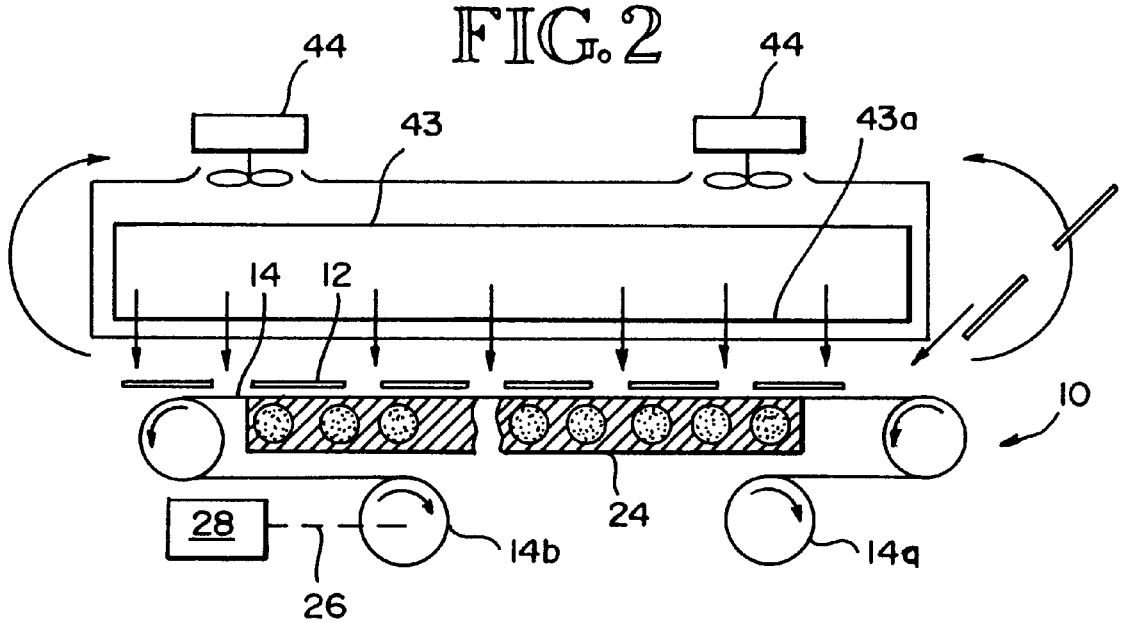
FIG. 2 depicts the first zone of a quick-freezing system comprised of a lower traveling thin film conveyor conduction refrigeration subsystem in combination with an overhead forced-air convection refrigeration subsystem, where the overhead refrigeration subsystem directs high velocity jets of cold air that impinge onto the top sides of the food products.

According to FIG. 2, the convection subsystem comprises a refrigeration assembly 43 located appropriately so that refrigerated air could be directed into top impingement sections 43a by air fans 44. The impingement section extends across the product-conveying course and is provided with pluralities of high velocity air outlet jet nozzles distributed across the conveying course so that high velocity refrigerated air streams may be directed vertically on the top sides of the food products conveyed through zone 10. The bold arrows pointing to the top surface of the processing course from the impingement sections represent the impingement jet streams from the nozzles. The air fans 44 could also recirculate air from the conveyor course back through the refrigeration coils continuously, as indicated by the curved arrows.

The system of FIGS. 1 and 2 may also provide a subsequent refrigerated zone 18 where the products are deposited from the end of the thin film conveyor onto a subsequent conveyor 20 for further thermal treatment. Exemplary subsequent refrigerated zones are illustrated in FIGS. 3–7. The thermal conditioning occurring in zone 18 may be by thermal conduction or convection, depending on the form of heat transfer mechanism employed in that zone. A subsequent refrigeration zone 22 for thermal treatment of the food products 12 may also be provided where the products are deposited from the end of conveyor 20 onto a subsequent conveyor 24 for further thermal treatment. The thermal conditioning occurring in zone 22 may be by thermal conduction or convection, depending on the form of heat transfer mechanism employed in that zone. The zones 10 and 18, and 22 if provided, are preferably stacked one below another and arranged so that food products may cascade downward from the end of one conveyor onto the beginning of the subsequent conveyor. Although not shown in the Figures, it would be appropriate for some food products to provide a transfer mechanism for transferring food products from one conveyor to the other, such as a slide or guide or other means, and the transfer could upend the food products as well so that the unprocessed side could be placed side-down on the subsequent conveyor.

Figure 3:
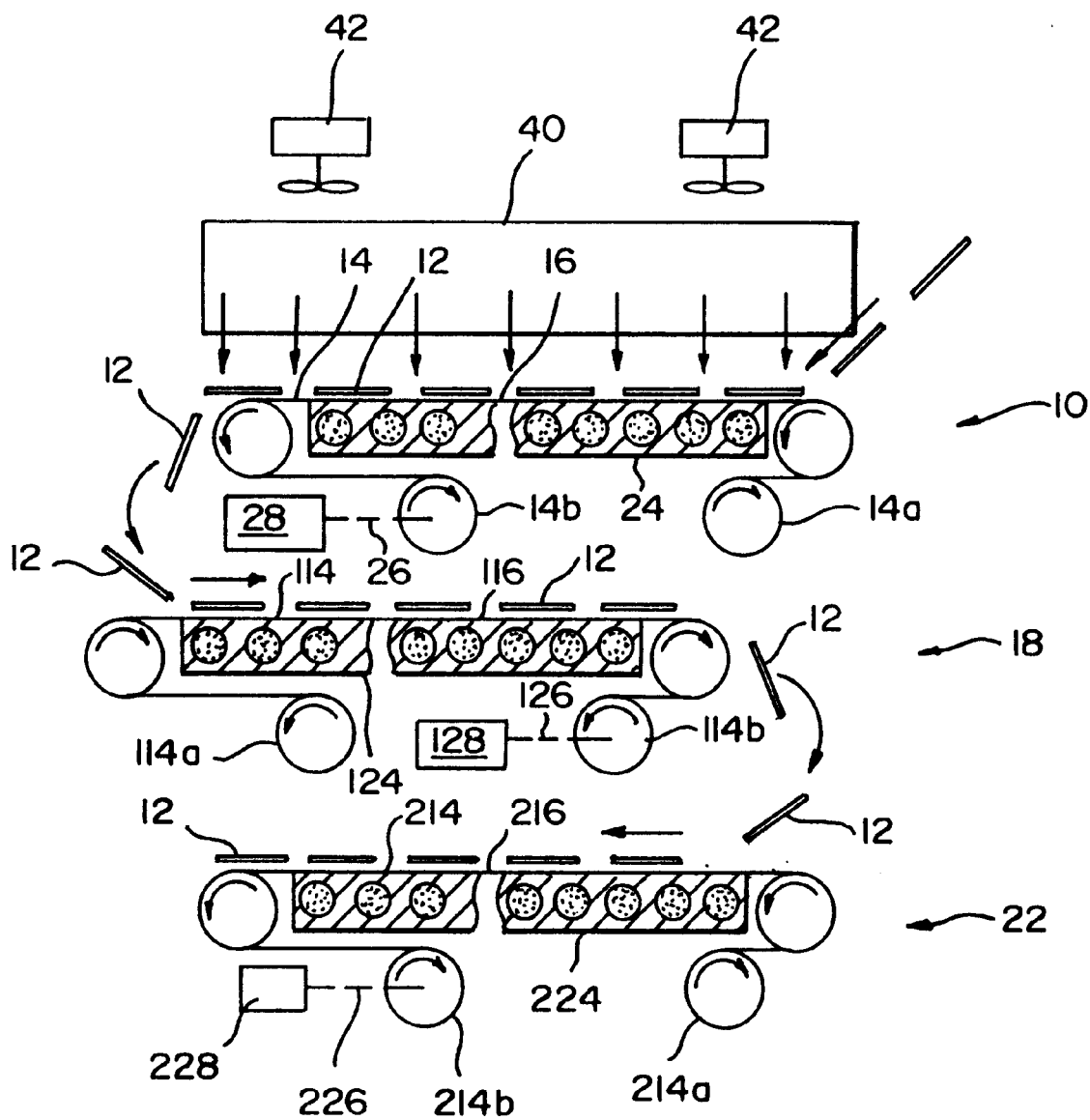
FIG. 3 depicts a three zone system with the first zone comprised of the FIG. 1 arrangement, with the subsequent two zones each comprised of a lower traveling thin film conveyor conduction refrigeration subsystem.
Figure 4:
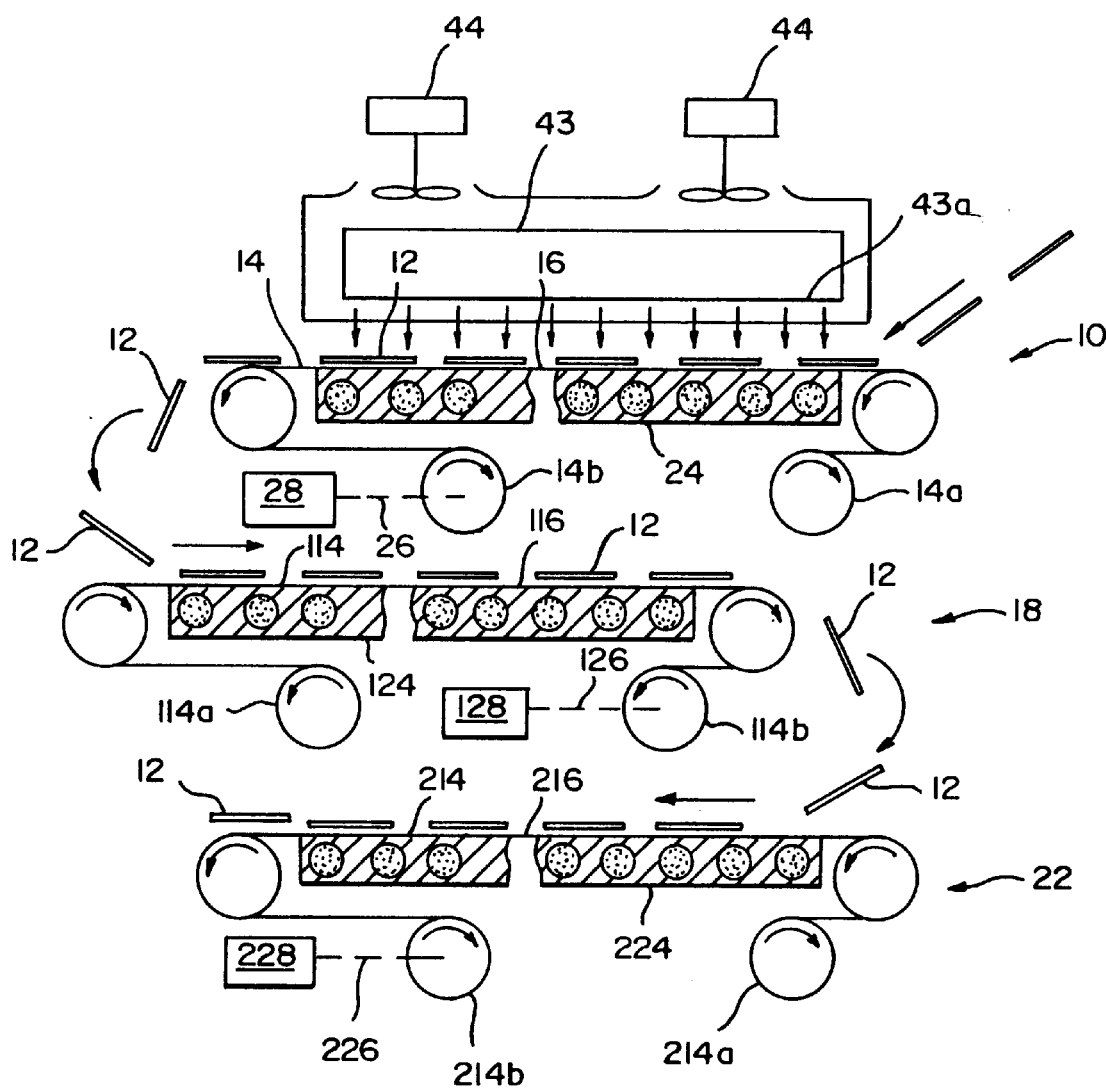
FIG. 4 depicts a three zone system with the first zone comprised of the FIG. 2 arrangement, with the subsequent two zones each comprised of a lower traveling thin film conveyor conduction refrigeration subsystem.

As shown in FIGS. 3 and 4, the film contact conveyor freezing zone 10 is followed by two additional zones 18 and 20 wherein the bottom quick-freezing subsystems are the same as in zone 10 of FIGS. 1 and 2. In addition, the top quick freezing subsystem of FIG. 3 is the same as in FIG. 1, and the top quick freezing subsystem of FIG. 4 is the same as in FIG. 2. Each of the two additional zones in both FIGS. 3 and 4 includes a film contact conveyor system composed of (a) a thermal surface, (b) a traveling thin film, (c) a drive mechanism for moving the thin film across the thermal surface, and (d) a control system for controlling and monitoring the drive mechanism. The elements within the two additional zones are numbered in multiples of 100 for the elements that are comparable to those of zone 10. Zone 18 elements are a 100 series and zone 22 elements are a 200 series. Whereas the contact film 14 travels from right to left in zone 10, film 114 travels from left to right in zone 18, and film 214 travels from right to left in zone 22. The three zones are stacked one below the other and zone 18 is staggered so that food products 12 from the discharge end of zone 10 will cascade down onto the infeed end of zone 18, and so that the food products 12 from the discharge end of zone 18 will cascade down onto the infeed end of zone 22. as shown in FIG. 1.

Where one or two subsequent zones, such as zones 18 and 22, are also contact film freezers, the discharge from one zone to the next may be designed so that the food products 12 turn over in the process of cascading from zone to zone as shown in FIG. 1. Consequently, where zone 18 crust freezes the bottom of the food products conveyed through the zone, the cascading of the food products turns them so that the crust frozen bottom now becomes the top side in zone 18 and the unfrozen top side in zone 10 becomes the bottom side in zone 18, thereby effecting a crust freezing of that side of the food products. Then, subsequent turning of the food products cascading from zone 18 to zone 22 will turn the food products over a second time and the freezing of the food products is completed in zone 22. Typically, in an arrangement such as depicted in FIG. 1, each zone will effect one third of the freezing of thin food products such as hamburger patties, so that one third is crust frozen in zone 10, one third is crust frozen on the opposite side in zone 18, and the middle one third is frozen in zone 22. This arrangement would work well for fish fillets and chicken breasts, as well as for hamburger patties and similar relatively flat food products. The initial contact freezing that occurs in zone 10 is sufficient to firm the product so that depositing the product on the next conveyor below in zone 18 will not hurt the product.

Figure 5:
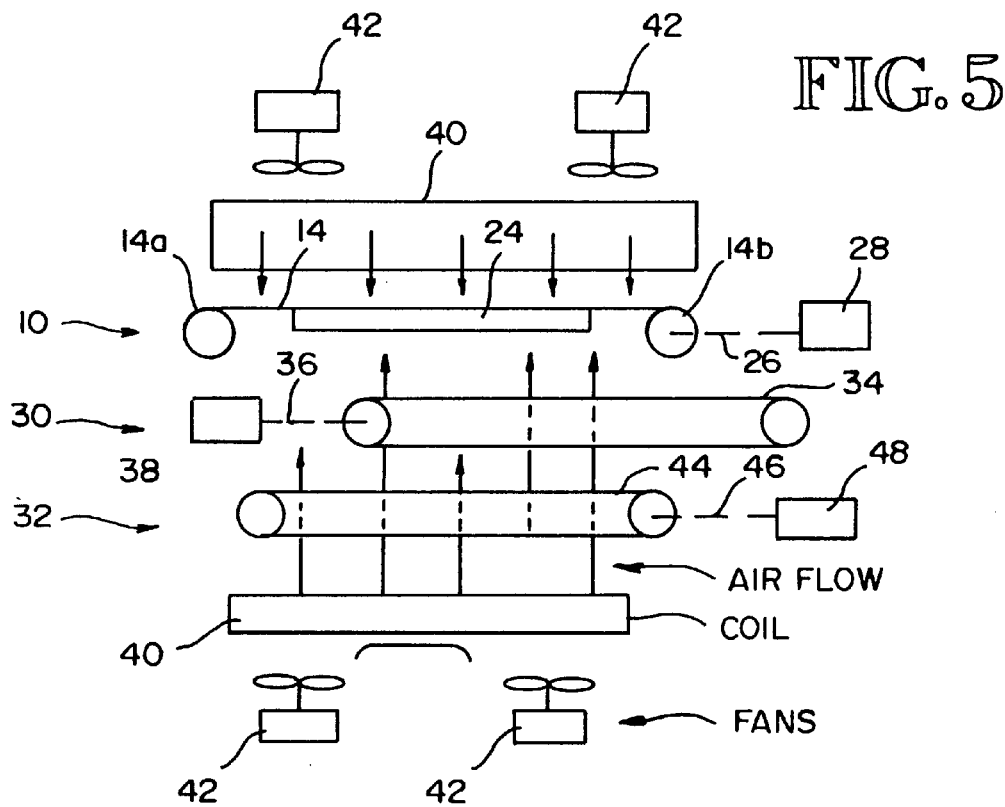
FIG. 5 depicts a three zone system with the first zone comprised of the FIG. 1 arrangement, with the subsequent two zones each comprised of endless loop open-mesh conveyor systems refrigerated with updrafted refrigerated air.
Figure 6:
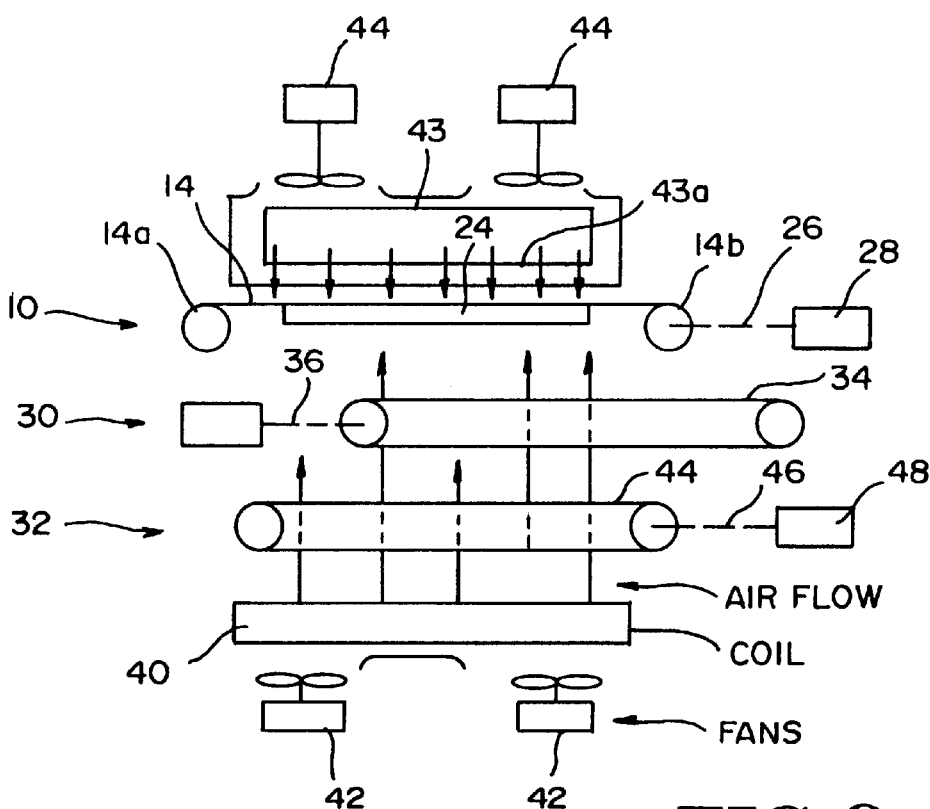
FIG. 6 depicts a three zone system with the first zone comprised of the FIG. 2 arrangement, with the subsequent two zones each comprised of endless loop open-mesh conveyor systems refrigerated with updrafted refrigerated air.

FIGS. 5 and 6 depict another arrangement of three freezing zones. In the FIG. 5 arrangement, the topmost zone 10 is the same as in FIG. 1. In the FIG. 6 arrangement, the topmost zone 10 is the same as in FIG. 2. The two subsequent zones in FIGS. 5 and 6, however, represent different conveyor configurations suitable for refrigerated air flow from below, up through the bottom-most and up through the intermediate freezing zone. In this arrangement, the intermediate zone 30 and the bottom-most zone 32 provide endless loop open-mesh conveyor belts that convey the food products through the updraft of refrigerated air. The food products in zones 30 and 32 would be contacted on their undersides by the updrafting refrigerated air as they are carried by the open-mesh conveyor belts through the respective zones. In this arrangement, the food products would be cascaded down into the next zone and the cascading could be designed to turn the food products over so that different sides are contacted by the updrafting refrigerated air. Each of the open-mesh conveyor belts, 34, 44, would be controlled by an appropriate drive mechanism, 36 46, and control system, 38, 48. A refrigeration assembly 40 would be located appropriately so that air fans 42 could draft air through the refrigeration coils of the refrigeration assembly for cooling to the desired freezing temperature, and then through the conveyor belts 34, 44.

Figure 7:
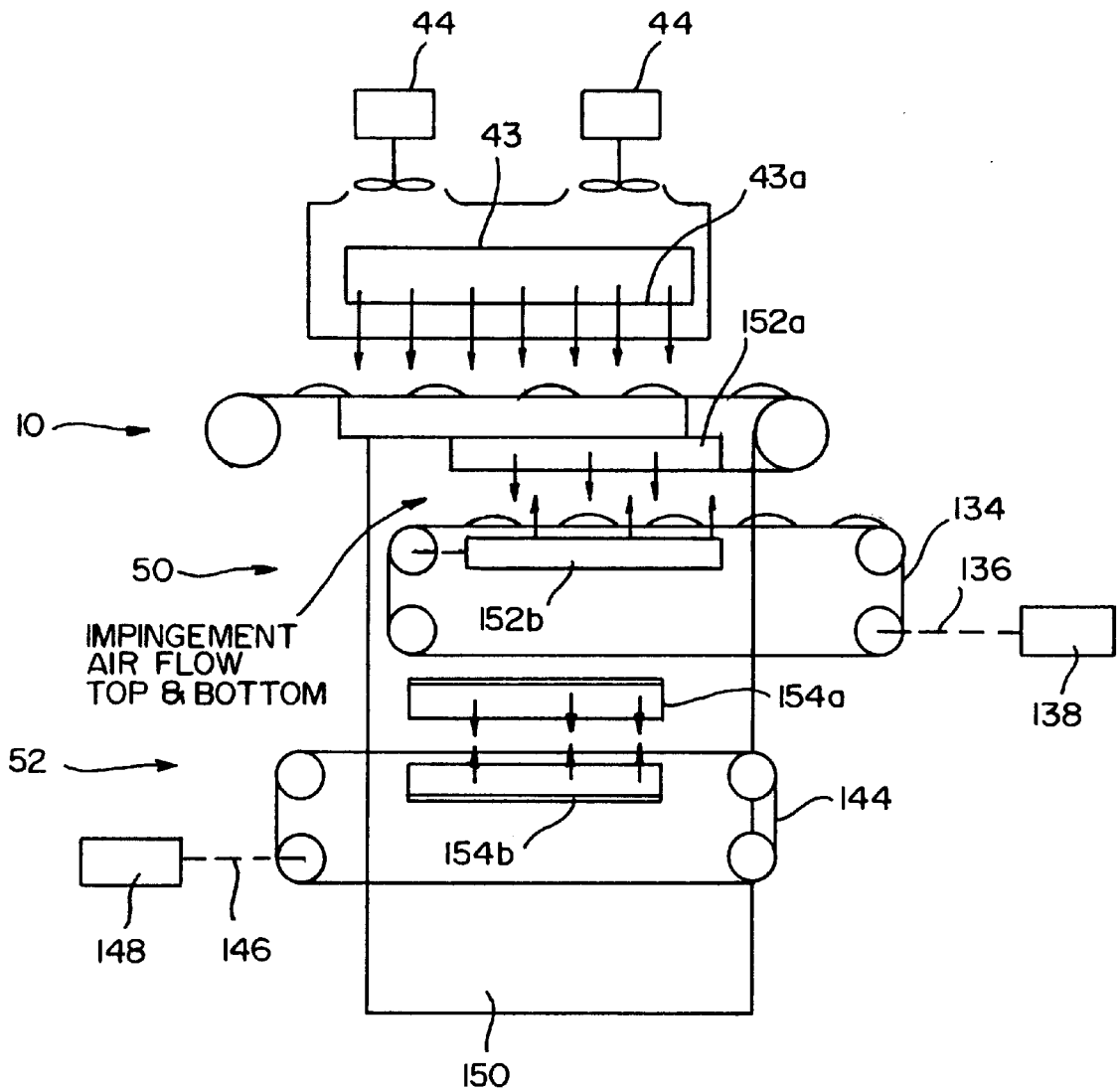
FIG. 7 depicts a three zone system with the first zone comprised of the FIG. 2 arrangement, with the subsequent two zones each comprised of endless loop open-mesh conveyor systems refrigerated with refrigerated air impingement jets.

FIG. 7 depicts another arrangement of three freezing zones. In this arrangement, the topmost zone 10 is the same as in FIG. 2. The two subsequent zones, however, represent different conveyor configurations suitable for refrigerated air impingement flow on the food products simultaneously from above and below along each conveyor product-carrying course. In this arrangement, the intermediate zone 50 and the bottom-most zone 52 provide endless loop open-mesh conveyor belts that convey the food products through the refrigerated air impingement streams. The food products in zones 50 and 52 would be contacted simultaneously on both sides by high velocity impingement refrigerated air streams as they are carried by the open-mesh conveyor belts through the respective zones. In this arrangement, the food products would be cascaded down into the next zone and the cascading could be designed to either turn the food products over or not. Each of the open-mesh conveyor belts, 134, 144, would be controlled by an appropriate drive mechanism, 136, 146, and control system, 138, 148. A refrigeration assembly 150 would be located appropriately so that refrigerated air could be directed into top and bottom impingement sections 152a, 152b and 154a, 154b for each zone. The impingement sections extend across the product-conveying courses and are provided with pluralities of high velocity air outlet jet nozzles distributed across the conveying courses of the intermediate and bottom-most conveyors 134, 144 so that high velocity refrigerated air streams may be directed vertically on both sides of the food products conveyed through zones 50 and 52. The bold arrows pointing to the top and bottom surfaces of the processing course of the conveyors from the impingement sections 152a, 152b and 154a, 145b represent the impingement jet streams from the nozzles.

Figure 8:
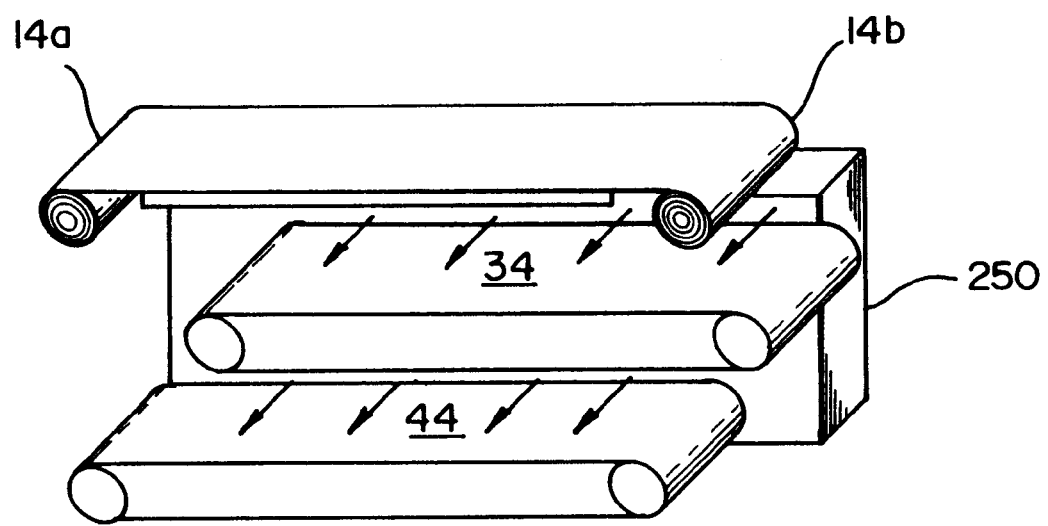
FIG. 8 depicts a three zone system with the lower two zones comprised of endless loop open-mesh conveyor systems refrigerated with cross drafted refrigerated air.

FIG. 8 depicts another arrangement of three freezing zones which have the same conveyor arrangements as shown in FIGS. 5 and 6 and described in the section referencing those figures, but rather than having an up-draft through lower conveyors 34 and 44, cross-draft is provided by refrigeration assembly 250 such that refrigerated air is directed from refrigeration assembly 250 transversely to the moving path of the lower conveyors.

While the preferred embodiment of the invention has been described herein, variations in the design may ba made. The scope of the invention, therefore, is only to be limited by the claims appended hereto.

The embodiments of the invention in which an exclusive property is claimed are defined as follows.

I claim:

1. A quick-freezing system for food products, comprising: at least a first and second zone of thermal treatment, said first zone providing a film contact conveyor means comprised of a thermal surface, a traveling thin film, drive means for moving the thin film across the thermal surface, and control means for controlling and monitoring the drive means; refrigeration means for refrigerating air for distribution on to said traveling thin film, and air circulating means for directing refrigerated air from said refrigeration means onto said thin film from above.

2. The system of claim 1 wherein said refrigeration means and said air circulating means are so constructed and arranged to direct low velocity refrigerated air onto said thin film.

3. The system of claim 1 wherein said refrigeration means and said air circulating means are constructed and arranged so as to direct high velocity jets of refrigerated air downward so as to impinge on said thin film.

4. A multi-pass system for quick-freezing food products, comprising: at least first and second zones of thermal treatment; said first zone providing a film contact conveyor means comprised of a thermal surface, a traveling thin film, drive means for moving the thin film across the thermal surface, and control means for controlling and monitoring the drive means; said first zone further providing refrigeration means for refrigerating air for distribution onto said traveling thin-film, and air circulating means for directing refrigerated air from said refrigeration means onto said thin film from above; and said second zone underlaying said first zone providing a second conveyor means comprised of a product conveyor means, second drive means for said product conveyor means and second control means for controlling and monitoring the second drive means, said second conveyor means being located such that food products may be cascaded from said traveling thin film downward onto said product conveyor means.

5. The system of claim 4 wherein said second conveyor means is a second film contact conveyor means comprised of a second thermal surface, a second traveling thin film, and said second drive means is constructed and arranged for moving the thin film across the thermal surface.

6. The system of claim 5 including a third zone of thermal treatment providing a third film contact conveyor means comprised of a third thermal surface, a third traveling thin film, third drive means for moving the thin film across the thermal surface, and third control means for controlling and monitoring the third drive means, said third conveyor means being located such that food products may be cascaded from said second traveling thin film downward onto said third conveyor means.

7. The system of claim 4 wherein said second conveyor means is comprised of an endless loop open-mesh conveyor means for conveying food products though an updraft of refrigerated air, refrigeration means for refrigerating air for distribution through said open-mesh conveyor means, and air circulating mean for directing refrigerated air from said refrigeration means through said open-mesh conveyor means from below; said open-mesh conveyor means being located below said film contact conveyor means.

8. The system of claim 7 including a third zone of thermal treatment providing a second endless loop open-mesh conveyor means for conveying food products though an updraft of refrigerated air, third drive means for said second open-mesh conveyor means and third control means for controlling and monitoring the third drive means, said second open-mesh conveyor means being located such that food products may be cascaded from the first-mentioned endless loop open-mesh conveyor means downward onto said second open-mesh conveyor means; said air circulating means being constructed and arranged for directing refrigerated air from said refrigeration means through said second open-mesh conveyor means from below and then through the first-mentioned endless loop open-mesh conveyor means.

9. The system of claim 4 wherein said second conveyor means is comprised of an endless loop open-mesh conveyor means for conveying food products though a cross draft of refrigerated air, refrigeration means for refrigerating air for distribution through said open-mesh conveyor means, and air circulating mean for directing refrigerated air from said refrigeration means across said open-mesh conveyor means from the side; said open-mesh conveyor means being located below said film contact conveyor means.

10. The system of claim 9 including a third zone of thermal treatment providing a second endless loop open-mesh conveyor means for conveying food products though a cross draft of refrigerated air, third drive means for said second open-mesh conveyor means and third control means for controlling and monitoring the third drive means, said second open-mesh conveyor means being located such that food products may be cascaded from the first-mentioned endless loop open-mesh conveyor means downward onto said second open-mesh conveyor means; said air circulating means being constructed and arranged for directing refrigerated air from said refrigeration means simultaneously across said second open-mesh conveyor means and the first-mentioned endless loop open-mesh conveyor means.

11. A multi-pass thermal treating system for food products, comprising: at least first and second refrigerated zones; said first zone providing a film contact conveyor means comprised of a refrigerated surface, a traveling thin film, drive means for moving the thin film across the refrigerated surface, and control means for controlling and monitoring the drive means; said first zone further providing refrigeration means for refrigerating air for distribution on to said traveling thin-film, and air circulating means for directing refrigerated air from said refrigeration means onto said thin film from above; and said second zone underlaying said first zone providing a second conveyor means comprised of a product conveyor means, second drive means for said conveyor means and second control means for controlling and monitoring the second drive means, and second refrigerated means; said second conveyor means being located such that food products may be cascaded from said traveling thin film downward onto said product conveyor means.

12. The system of claim 11 wherein said second conveyor means is a second film contact conveyor means comprised of a second refrigerated surface, a second traveling thin film, and said second drive means is constructed and arranged for moving the thin film across the refrigerated surface.

13. The system of claim 12 including a third zone of thermal treatment providing a third film contact conveyor means comprised of a third refrigerated surface, a third traveling thin film, third drive means for moving the thin film across the refrigerated surface, and third control means for controlling and monitoring the third drive means, said third conveyor means being located such that food products may be cascaded from said second traveling thin film downward onto said third conveyor means.

14. The system of claim 11 wherein said second conveyor means is comprised of an endless loop open-mesh conveyor means for conveying food products through an updraft of refrigerated air, refrigeration means for refrigerating air for distribution through said open mesh conveyor means, and air circulating means for directing refrigerated air from said refrigeration means through said open-mesh conveyor means from below; said open-mesh conveyor means being located below said film contact conveyor means.

15. The system of claim 14 including a third zone of refrigeration providing a second endless loop open-mesh conveyor means for conveying food products though an updraft of refrigerated air, third drive means for said second open-mesh conveyor means and third control means for controlling and monitoring the third drive means, said second open-mesh conveyor means being located such that food products may be cascaded from the first-mentioned endless loop open-mesh conveyor means downward onto said second open-mesh conveyor means; said air circulating means being constructed and arranged for directing refrigerated air from said refrigeration means through said second open-mesh conveyor means from below and then through the first-mentioned endless loop open-mesh conveyor means.

16. The system of claim 11 wherein said second conveyor means is comprised of an endless loop open-mesh conveyor means for conveying food products though a cross draft of refrigerated air, refrigeration means for refrigerating air for distribution through said open-mesh conveyor means, and air circulating mean for directing refrigerated air from said refrigeration means across said open-mesh conveyor means from the side; said open-mesh conveyor means being located below said film contact conveyor means.

17. The system of claim 16 including a third zone of refrigeration providing a second endless loop open-mesh conveyor means for conveying food products though a cross draft of refrigerated air, third drive means for said second open-mesh conveyor means and third control means for controlling and monitoring the third drive means, said second open-mesh conveyor means being located such that food products may be cascaded from the first-mentioned endless loop open-mesh conveyor means downward onto said second open-mesh conveyor means; said air circulating means being constructed and arranged for directing refrigerated air from said refrigeration means simultaneously across said second open-mesh conveyor means and the first-mentioned endless loop open-mesh conveyor means.

18. A system for freezing food products, comprising:
   a thermal surface;
   a thin film conveyor disposed on top of the thermal surface and traveling thereon, the thin film conveyor receiving the food products and providing for thermal conduction between the food products and the thermal surface;
   a source for refrigerated air; and
   an air circulation system which directs refrigerated air from the source downward onto the film.

19. A multi-pass system for freezing food products, comprising:
   at least first and second zones of thermal treatment;
   the first zone having a thermal treatment system comprising a thermal surface, a thin film conveyor disposed on top of the thermal surface and traveling thereon, the thin film conveyor receiving the food products and providing for thermal conduction between the food products and the thermal surface, a source for refrigerated air, and an air circulation system which directs refrigerated air from the source downward onto the film;
   the second zone being vertically spaced from the first zone and having a second product conveyor constructed and arranged such that food products may be cascaded from the thin film conveyor of the first zone onto the second product conveyor.

20. The system of claim 19, wherein the second zone includes a second thermal surface and said second product conveyor comprises a second thin film disposed on top of the second thermal surface and traveling thereon.

21. The system of claim 20, further comprising a third zone of thermal treatment comprising a third thermal surface and a third thin film conveyor disposed on top of the third thermal surface and traveling thereon, the third zone being vertically spaced from the second zone and located such that food products may be cascaded from the conveyor of the second zone onto the third product conveyor.

22. The system of claim 19, wherein the second product conveyor comprises an endless loop open-mesh conveyor, and firther comprising a source for refrigerated air, an air circulation system which directs refrigerated air from the source through the open-mesh conveyor from below.

23. The system of claim 22, further comprising a third zone of thermal treatment comprising a second endless loop open-mesh conveyor, the third zone being vertically spaced from the second zone and located such that food products may be cascaded from the conveyor of the second zone onto the third product conveyor, the third zone being located such that the air circulation system also directs air through the second open mesh conveyor from below.

24. The system of claim 19, wherein the second product conveyor comprises an endless loop open-mesh conveyor, and further comprising a source for refrigerated air, an air circulation system which directs refrigerated air from the source into the open-mesh conveyor from above and below.

25. The system of claim 22, further comprising a third zone of thermal treatment comprising a second endless loop open-mesh conveyor, the third zone being vertically spaced from the second zone and located such that food products may be cascaded from the conveyor of the second zone onto the third product conveyor, the third zone being located such that the air circulation system also directs air into the second open mesh conveyor from above and below.

26. The system of claim 19, wherein the second product conveyor comprises an endless loop open-mesh conveyor, and further comprising a source for refrigerated air, an air circulation system which directs refrigerated air from the source through the open-mesh conveyor from its side.

27. The system of claim 26, further comprising a third zone of thermal treatment comprising a second endless loop open-mesh conveyor, the third zone being vertically spaced from the second zone and located such that food products may be cascaded from the conveyor of the second zone onto the third product conveyor, the third zone being located such that the air circulation system also directs air through the second open mesh conveyor from its side.

* * * * *